United States Patent [19]

Hausheer

[11] E Re. 31,055

[45] Reissued Oct. 12, 1982

[54] APERTURE MASK SUPPORTED BY SPRING LUGS AND SPRING CLIPS

[75] Inventor: Lawrence B. Hausheer, Corning, N.Y.

[73] Assignee: Corning Glass Works, Corning, N.Y.

[21] Appl. No.: 219,913

[22] Filed: Dec. 24, 1980

Related U.S. Patent Documents

Reissue of:

[64] Patent No.: 4,209,727
Issued: Jun. 24, 1980
Appl. No.: 954,489
Filed: Oct. 25, 1978

[51] Int. Cl.[3] ..... H01J 29/07; H01J 31/08; H01J 29/82

[52] U.S. Cl. ..... 313/404; 313/482

[58] Field of Search ..... 313/404, 405, 406, 407, 313/482

[56] References Cited

U.S. PATENT DOCUMENTS 2,690,518 9/1954 Fyler et al. ..... 313/404
2,755,405 7/1956 Wilhelm ..... 313/404
4,065,693 12/1977 Gijrath ..... 313/406

*Primary Examiner*—Robert Segal
*Attorney, Agent, or Firm*—John P. DeLuca

[57] ABSTRACT

In a color TV bulb formed with a panel, a peripheral panel skirt integral therewith, a funnel portion adapted to mate therewith, a frame and aperture mask adapted to be mounted in said frame and secured in spaced relation with the panel; a supporting structure for the aperture mask and frame including peripherally located outwardly extending spring lugs and spring clips attached to the frame respectively operative for xy orientation and Q spacing of the aperture mask. The panel skirt is formed with a selected number of V grooves located each for receiving a corresponding one of the spring lugs and a ledge face spaced away from the inside surface of the panel to cooperatively engage with and support the spring clips. A forward surface of the funnel engages the spring clips to urge same against the ledge face such that the xy orientation and Q spacing of the aperture mask are fixed relative to the panel.

8 Claims, 11 Drawing Figures

FIG. 4
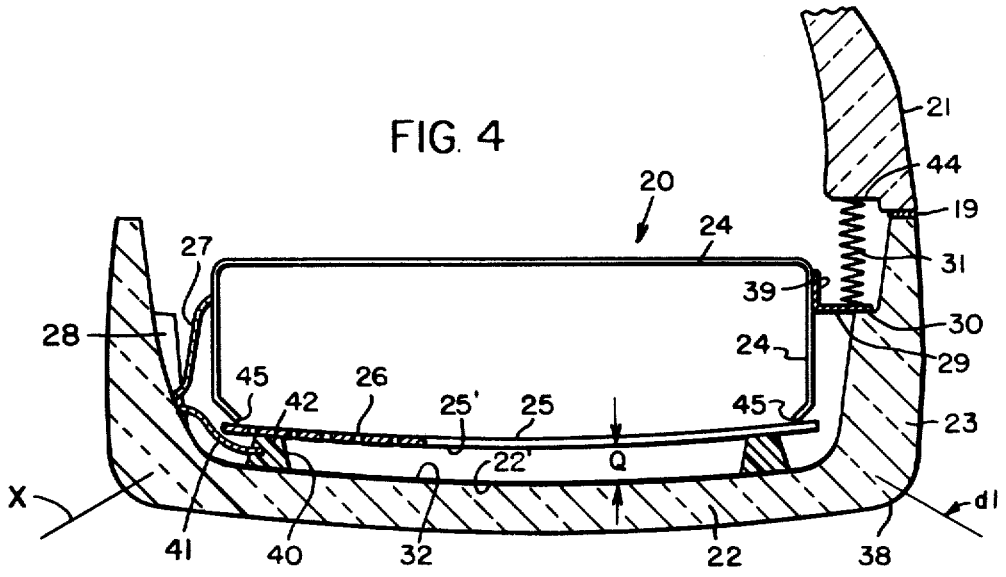
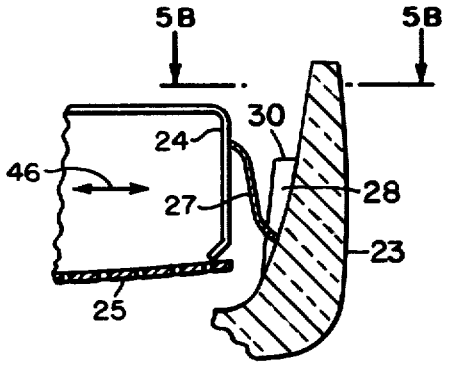
FIG. 5A
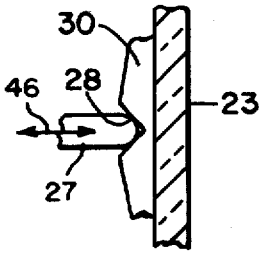
FIG. 5B

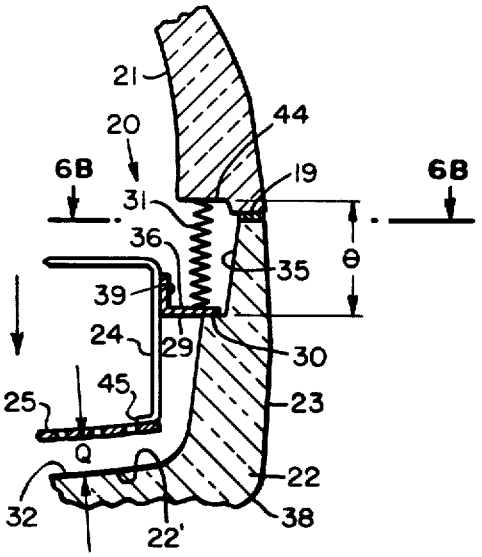
FIG. 6A
FIG. 6B
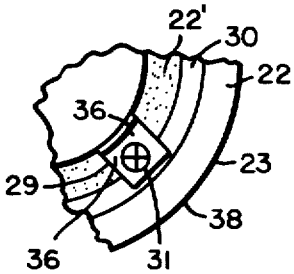
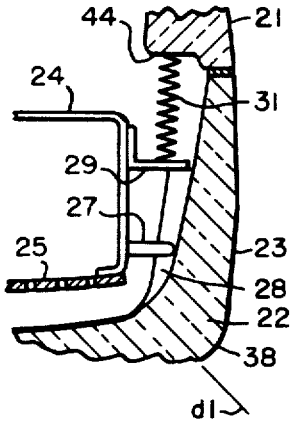
FIG. 7

APERTURE MASK SUPPORTED BY SPRING LUGS AND SPRING CLIPS

Matter enclosed in heavy brackets [ ] appears in the original patent but forms no part of this reissue specification; matter printed in italics indicates the additions made by reissue.

*This application is a Reissue application of Ser. No. 954,489, filed October 25, 1978.*

BACKGROUND OF THE INVENTION

In color television tubes, color purity relies mainly on alignment of the guns, the aperture mask, and the phosphor pattern developed on the screen. Impurity results when the alignment established during the phosphor pattern development is not retained in the operating tube. One of the principal errors is incorrect Q space in the operating tube caused by changes in the shape of the glass or mask or both during processing. The error is most pronounced and most evident in the corners of the picture.

In a conventional color television picture tube 10 illustrated in FIGS. 1a and 1b labeled as Prior Art. A TV panel 11 has a peripherally located integral skirt 12 which mates along a seal 13 with a funnel portion 14. An aperture mask 15 of conventional design is mounted in a frame 16 which is in turn oriented in an xy direction (FIG. 1a) and at a selected Q spacing (FIG. 1b) from the panel 11 by clips 17 welded to the frame 16. The clips 17 have a free end each engaging a stud 18 which in turn is mounted in the panel skirt 12.

Typically the studs 18 are fabricated from metal pins, whihc are fused in the panel skirt 12. The equipment necessary for mounting and locating the studs 18 is expensive and is sometimes a source for tube rejects.

Many variations of the prior art arrangement illustrated in FIGS. 1a and 1b exist, however the systems are characteristic, in that, they use some sort of stud arrangement which is fused to the glass for supporting the aperture mask 15 and frame 16.

The present invention minimizes errors which results from the arrangement illustrated in FIGS. 1a and 1b, and eliminates the need for studs 18 and the equipment necessary to install them. Furthermore, losses associated with the stud seal arrangement and advantages of the present invention provide for a less costly and more efficient aperture mask mounting system.

SUMMARY OF THE INVENTION

In a color TV bulb formed with a panel, a peripheral panel skirt integral therewith, a funnel portion adapted to mate with the panel skirt and an aperture mask adapted to be mounted in a frame in spaced relation with the panel; a supporting structure for the aperture mask and frame including peripherally located outwardly extending spring lugs and spring clips attached to the frame, respectively operative for xy orientation and Q spacing of the mask. The panel skirt is formed with a selected number of V grooves, each located for receiving a corresponding one of the spring lugs, and a ledge face spaced away from an inside surface of the panel to cooperatively engage with and support the spring clips. A forward surface of the funnel engages the spring clips to urge same against the ledge face such that the xy orientation and Q spacing of the aperture mask are fixed relative to the panel when the funnel is mated with the skirt.

DESCRIPTION OF THE [PREFERRED EMBODIMENT] *DRAWINGS*

FIG. 3b is a side sectional view taken along lines 3b—3b of FIG. 3a.

FIG. 4 is an offset sectional view of the color TV bulb illustrated in FIG. 2 taken along lines 4—4 thereof, which line is offset as it passes through the center line of the tube to show both a portion of the diagonal axis as well as a major axis of the tube.

FIGS. 5a and 5b are respective side and top sectional fragmented views of a spring lug arrangement for xy orientation of the aperture mask and frame.

FIGS. 6a and 6b are respectively fragmented side and top sectional views of a spring clip arrangement for providing Q spacing for the aperture mask and frame.

FIG. 7 shows a preferred embodiment of the support structure of the present invention with corner orientation.

[FIGS. 8a and 8b show another embodiment in respective fragmented side and top views of the present invention with circumferential V grooves.]

DESCRIPTION OF THE PREFERRED EMBODIMENT

Figure 1A:
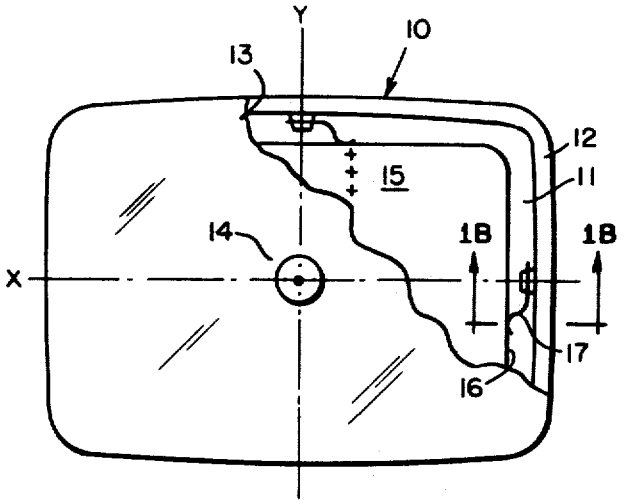
FIG. 1A (PRIOR ART)
FIGS. 1a and 1b are labeled Prior Art and show respectively, a fragmented rear view of a conventional color television bulb with conventional mounting of a TV aperture mask, and a side sectional fragmented detail of the mounting system of the prior art TV bulb.
Figure 1B:
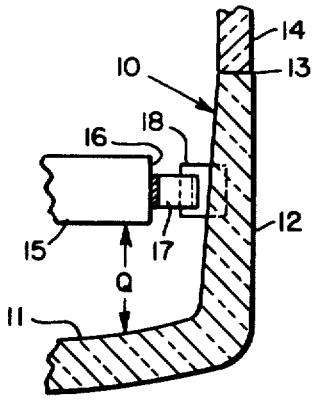
FIG. 1B (PRIOR ART)
Figure 2:
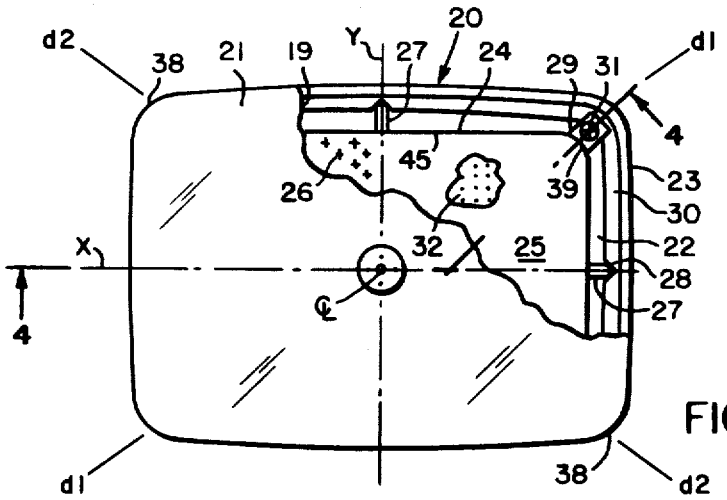
FIG. 2 is a fragmented rear elevation of a color TV bulb incorporating the new aperture mask mounting of the present invention.

In FIG. 2 a typical color television bulb 20 is illustrated in a rear fragmented view. The color television bulb 20 sometimes referred to herein as bulb 20 includes a funnel 21 and a panel 22, which panel includes a peripheral skirt 23. Located within the panel [23] *22* is an aperture mask supporting frame or frame 24 which supports an aperture mask 25 of a conventional design having precisely located openings 26 therein. The purpose of the openings 26 in the aperture mask 25 simply referred to as the mask, is known in the art. The frame 24 has spring lugs 27 attached thereto on four sides in an xy orientation, which spring lugs 27 mat with axially aligned V grooves 28 located in the skirt 23 of the panel 22. The V grooves 28 are preferably located along either x or y axes of the panel 22 (sometimes referred to as respective major and minor axes) but may, in alternate embodiments, be located along one of the diagonals of the tube 20, i.e., at corners 38 along diagonals d1—d1 or d2—d2 or elsewhere, e.g. any of the 2 diagonals or any 3 locations approximately 120° apart as in a 3 pin system.

Spring clips 29 preferably have one end secured at corners 39 of frame 24 and each one engages a ledge portion or ledge 30 circumferentially formed in and located peripherally about the inside of skirt 23. The spring clips 29 are each biased against and ledge 30 by a cooperating spring 31 which engages a rear face 36 of the free end of the spring clip 29, and urges it against the ledge 30 such that Q spacing is established. Spring 31 may be spot welded to the rear face 36 of the spring clip 29 if desired or held in place by other means such as may be available.

The spring lugs 27 and spring clips 29 locate the frame 24 and mask 25 with respect to the panel face 22 which thereby orients the openings 26 in the mask 25 with respect to a dot pattern 32 on the panel face 22. The dot pattern 32 is conventionally developed.

Figure 3A:
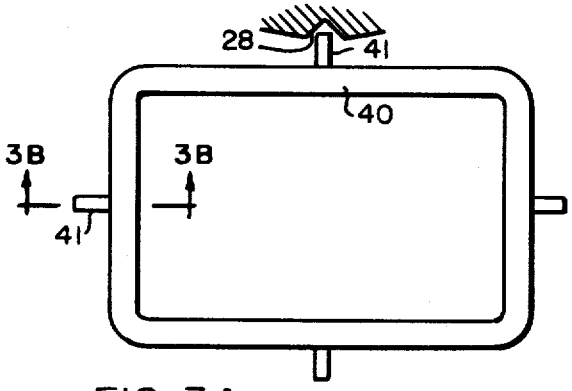
FIG. 3a is a top view of a Q space fixture for use in mounting the aperture mask illustrated herein.

In FIG. 3a there is illustrated a Q spacer fixture 40 which includes a set of peripherally attached spring lugs 41 which are similar in function to the spring lugs 27 illustrated in FIG. 2. As is known in the art, a Q space fixture is a temporary alignment device adapted to rest inside the bulb 20 on the panel face 22 to establish a uniform Q space between a forward face 25' of the mask 25 and an inside face 22' of the panel 22. Spring lugs 41 engage with the V grooves 28 for establishing xy orientation of the Q space fixture 40 inside the bulb 20.

Figure 3B:
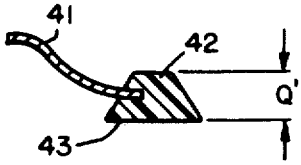

In cross section the Q space fixture 40 resembles a trapizoidal member, which is illustrated in FIG. 3b and also in FIG. 4. Upper support surface 42 carries the aperture mask 25 and lower support surface 43 rests on the inside face 22' of the panel 22. Thus the thickness of Q' of the Q space fixture 40 establishes the Q space distance in FIG. 4.

As mentioned with respect to FIG. 2, the aperture mask frame 24 is oriented and supported by two means. The first means provides xy orientation and includes spring lugs 27 which may be located along the respective major and minor axes x and y of the tube 20 or the diagonals d1—d1 and d2—d2. The second means provides support and includes spring clips 29 which are welded to the frame at corners 28' and are biased towards the panel 22 by action of spring 31 compressively engaging the rear face 29 of the spring clip 29 and a forward face 44 of the funnel 21. It should be noted that as in the prior art, the funnel 21 and panel skirt 23 are fused along the seam 19.

In FIG. 4 the Q space fixture 40 is illustrated to show its function in establishing the Q space distance. However, in a finally assembled tube the Q space fixture is removed. In operation during the preparation of the dot pattern 32 on the inner surface 22' of the panel 22, the Q space fixture 40 is first inserted into the panel 22 and each of the spring lugs 41 engage with the V groove 28 about the periphery of the skirt 23. The Q space fixture 40 is thus properly oriented in the xy direction and allowed to rest on the panel 22. The aperture mask 25 is thereafter located at rest on the upper support face 42 of the Q space fixture 40. The aperture mask frame 24, carrying the spring lugs 27 and spring clips 29 is lowered into the panel 22 and set for xy orientation with the spring lugs 27 located in the V grooves 28. The aperture mask 25 and frame 24, now being oriented properly in the xy and Q space directions, are welded together along seam 45. *Alternatively, mask 25 and frame 24 which may be prejoined as in conventional television bulb practice, (See for example U.S. Pat. Nos. 2,690,518, 2,755,405, and 4,065,693) could be lowered into panel 22 onto Q space fixture 40 and xy oriented as above described. Thereafter spring clips 29 may be located as shown engaging ledge face 44 and joined to frame 24 as shown by welding or the like.* [Spring] *Therafter in either arrangement spring* 31 is urged against the spring clips 29 by a clamping device, not illustrated, but which serves the same function as the forward ledge face 44 of the funnel portion 21. During the development of the dot pattern 32, the mask 25 and frame 24 are removed successively for each color as is known in the art, and means may be provided to clamp or grasp the panel 22 and also urge the spring 31 in the direction of the ledge member 30 upon which the spring clip 29 rests.

The forward ledge face 44 of funnel 21 is formed, such that, it urges each spring 31 axially towards the spring clips 29. Consequently in a preferred embodiment the forward ledge face 44 oriented so as to lie in parallel relative to seam 19 and ledge 30, or perhaps converging towards seam 19 at an acute angle $\Phi$ from about 0° to about 5° therebetween. This orientation urges spring 31 towards a confined space bounded by forward ledge face 44, inner surface 35 of skirt 23 and ledge 30 so that the spring member 31 tends to remain stabily in place. Spring 31 is shown as a coil spring but may be any suitable configuration.

In FIG. 5a a fragmented side sectional elevation of a portion of the tube 20 including; the frame 24 and spring lugs 27, mask 25, and skirt 23 with V groove 28 is illustrated. The double arrow 46 illustrates the degree of freedom of the particular portion of the frame 24 with respect to the particular portion of the skirt 23 at the V groove 28 location. In FIG. 2 for example the directional arrow 46 would be oriented along either of the x or y axes.

FIG. 5b shows a fragmented top view of the spring lug 27 and panel 23 with the spring lug 27 engaging V groove 28. The spring lug 27 is free to be removed upwardly from the V groove 28 for various sequential steps in the formation of the dot pattern 32 and mask 25 orientation.

In FIG. 6a the fragmented side sectional view of the tube 20 is illustrated with the Q space fixture 40 removed to show the final assembly of the mask 25 as it is supported in the Q space direction by the frame 24 and the spring clip 29. Note in this drawing that the spring 31 urges the spring clip 29 against ledge member 30. The frame 24 attached to clip 29 at corner 39' is thus secured at a fixed position with respect to the panel 22. Likewise the aperture mask 25 welded to the frame 24 at seam 45 is held at the correct Q space distance from the inside surface 22' of the panel 22.

FIG. 6b illustrates in a top view the profile of the corner 38 of the panel 22 in the vicinity of ledge 30.

The arrangements illustrated in the drawings herein have been explained separately, so as to simplify the explanation of the invention and reduce the complexity of the drawings. Note however FIG. 7 wherein the V groove 28 is located below ledge member 30 in the corner 38 of panel 22. Spring lugs 28 and spring clips 29 are likewise located at corners 31 in a tandem arrangement (one above the other) to support the frame 24 and aperture mask. This arrangement is probably the most accurate and desirable.

[In FIGS. 8a and 8b, respective fragmented side sectional and top views illustrate a variation of the invention, with V groove 28' oriented circumferentially about skirt 23. Since a second forming operation would probably be required to form such circumferential V grooves 28' the embodiments descibed above illustrating axial grooves would be preferred. Note all other reference numerals are the same for similar components of the other previously described embodiments.]

While there has been described what at present is considered to be the preferred embodiment of the present invention, it will be obvious to those skilled in the art that various changes and modifications may be made therein without departing from the invention. It is intended in the appended claims to cover all such changes and modifications as fall within the true spirit and scope of the invention.

What is claimed is:

1. In a color television bulb formed with a panel, a peripheral panel skirt integral therewith, a funnel portion adapted to mate with the panel skirt, a frame and aperture mask adapted to be mounted in said frame and secured in spaced relation with the panel; a supporting structure for the aperture mask and frame including: peripherally located outwardly extending spring lugs and peripherally located outwardly extending spring clips secured to the frame and respectively operative for xy orientation and a Q spacing of the mask and frame; the panel skirt being formed with a selected number of V grooves each located so as to receive a corresponding one of the spring lugs; and a ledge face spaced away from an inside surface of the panel to cooperatively engage with and support the spring clips, a forward portion of the funnel adapted to be in spaced relation with the ledge face, spring means engaging each respective spring clip at one end and the forward portion of the funnel at the other when located in said spaced relation for urging each respective spring clip against the ledge face such that xy orientation and Q spacing of the aperture mask and frame are fixed relative to the panel when the funnel and panel skirt are mated.

2. The supporting structure of claim 1 wherein the spring clips and spring lugs are located at about 120° intervals about the periphery of the frame.

3. The supporting structure of claim 1 wherein the spring lugs are located along x and y axes of the frame and the spring clips are located along diagonal axes of the frame.

4. The supporting structure of claim 3 wherein the spring clips and the spring lugs are located in tandem at corners of the bulb along diagonal axes thereof.

5. The supporting structure of claim 1 wherein the spring clips include; a first clip member being attached at one end to the frame and having a free end adapted to rest on the ledge; and a spring member having a forward free end engaging a portion of the free end of the clip and being oriented so as to urge the first clip member in a direction towards the panel, said spring member having a rearward free end being urged against the clip by mating engagement with the forward portion of the funnel.

6. The supporting structure of claim 5 wherein the forward portion of the funnel engages the rearward free end of the spring member and includes; a ledge member lying at an acute angle between about 0° and about 5° with respect to the panel ledge member.

7. The supporting structure of claim 1 wherein the V grooves are axially aligned with the panel skirt.

[8. The supporting structure of claim 1 wherein the V grooves are circumferentially aligned with the panel skirt.]

9. A color television bulb comprising a formed studless panel, including a peripheral panel skirt integral therewith; a funnel portion adapted to mate with the panel skirt, a frame and aperture mask adapted to be mounted in said frame and secured in spaced relation with the panel; a supporting structure for the aperture mask and frame including: peripherally located outwardly extending spring lugs and peripherally located outwardly extending spring clips secured to the frame and respectively operative for xy orientation and a Q spacing of the mask and frame; the panel skirt being formed with a selected number of V grooves each located so as to receive a corresponding one of the spring lugs; and a ledge face spaced away from an inside surface of the panel to cooperatively engage with and support the spring clips, a forward portion of the funnel adapted to be in spaced relation with the ledge face; spring means engaging each respective spring clip at a one end and the forward portion of the funnel at the other when located in said spaced relation for urging each respective spring clip against the ledge face such that xy orientation and Q spacing of the aperture mask and frame are fixed relative to the panel when the funnel and panel skirt are mated.

* * * * *

UNITED STATES PATENT AND TRADEMARK OFFICE

CERTIFICATE OF CORRECTION

PATENT NO. : RE 31,055

DATED : October 12, 1982

INVENTOR(S) : Lawrence B. Hausheer

It is certified that error appears in the above-identified patent and that said Letters Patent are hereby corrected as shown below:

Column 1, line 32, "each" should be deleted.

Column 1, line 35, "whihc" should be --which--.

Column 1, line 43, "results" should be --result--.

Column 2, line 50, "mat" should be --mate--.

Column 3, line 62, "Therafter", should be --Thereafter--.

Column 4, line 9, "converging" should be --converting--.

Signed and Sealed this

Eighteenth Day of January 1983

[SEAL]

Attest:

GERALD J. MOSSINGHOFF

Attesting Officer

Commissioner of Patents and Trademarks